UNITED STATES PATENT OFFICE.

EMIL FISCHER, OF BERLIN, GERMANY, ASSIGNOR TO C. F. BOEHRINGER & SOEHNE, OF WALDHOF, GERMANY.

PROCESS OF MAKING PURIN DERIVATIVES.

SPECIFICATION forming part of Letters Patent No. 607,028, dated July 12, 1898.

Application filed November 13, 1897. Serial No. 658,492. (No specimens.)

*To all whom it may concern:*

Be it known that I, EMIL FISCHER, a citizen of the Empire of Germany, residing at Berlin, in the Empire of Germany, have invented certain new and useful Improvements in the Art of Preparing Purin Derivatives; and I do hereby declare the following to be a full, clear, and exact description of the invention, such as will enable others skilled in the art to which it appertains to make and use the same.

This invention relates to the art of preparing substitution products of purin, and in particular those substitution products or derivatives wherein an amido group or groups are introduced into the purin molecule. Of the purin derivatives which contain a substituted amido radical there have hitherto been known only amido caffein, ($C_8H_9N_4O_2.NH_2$.) (*Liebig's Annalen*, vol. 215, page 265.) The formula has by recent investigations (*Berichte der Deutschen Chemischen Gesellschaft*, vol. 30, page 549) been ascertained to be:

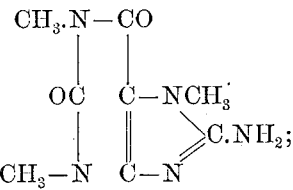

that is to say, it contains the substituted amido group in the parabanic ring or group of the purin molecule. No one has hitherto been able to obtain amido derivatives which contain the amido radical in the alloxan nucleus of the purin molecule. In the course of my experiments and researches I have succeeded in obtaining such purin derivatives and thereby demonstrated that the halogen atoms existing in the alloxan nucleus are susceptible of being replaced by amido or hydrazin radicals. I have thus been able to obtain a series of amido and hydrazin derivatives of purin, for whose designation I have found it desirable to make use of the nomenclature proposed by me and reported in *Sitzungsberichte der Königl. Preussischen Akademie*, January 8, 1897, and *Berichte der Deutschen Chemischen Gesellschaft*, vol. 30, page 557. According to this nomenclature the nitrogen and carbon atoms in the purin molecule are numbered as follows:

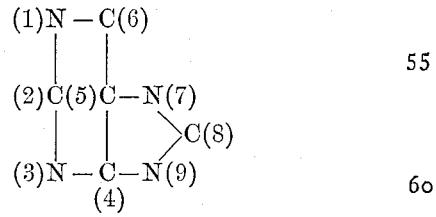

The present invention consists, broadly considered, in treating a halogen derivative of purin with ammonia, preferably in connection with the application of heat.

It also consists in an amido derivative of purin, in which the substituted amido radical is introduced into the alloxan nucleus of the purin—*i. e.*, the carbon atoms (2) and (6) according to the above nomenclature.

Finally, the invention consists in such other features, means, and methods as will be hereinafter described, and pointed out in the claims.

In illustration of my invention I will now proceed to describe in detail a number of examples, the proportions stated all being by weight, unless otherwise stated.

*Example No. 1—Preparation of 3.7 dimethyl 6 amido 2.8 dioxy purin from 3.7 dimethyl 6 chloro 2.8 dioxy purin.*—Seven parts of dimethyl-dioxychloro-purin, whose mode of preparation has been described in *Berichte der Deutschen Chemischen Gesellschaft*, vol. 28, page 2,486, and whose formula has by recent investigations (*Berichte der Deutschen Chemischen Gesellschaft*, vol. 30, page 554) been ascertained to be

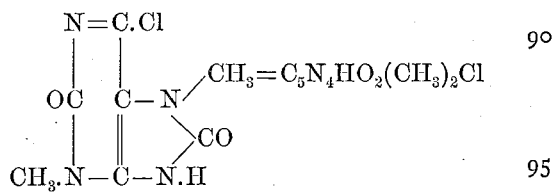

are heated in a digester to 130° centigrade, together with fifty parts of a solution of ammonia (saturated at .0° centigrade) and maintained at this temperature (130° centigrade)

for three hours. On cooling the ammonium salt of the amido compound is separated in copious quantities. The entire mass is evaporated without previously filtering, whereby the ammonia is driven off. The residue is lixiviated with cold water. As a result of this lixiviation or washing the new base is obtained as a residue in the form of a grayish-green-colored mass. For the purpose of further purifying the new compound it is dissolved in hot dilute hydrochloric acid and precipitated with sodium acetate while the same is heated. The yield is seventy per cent. of the chloro compound employed.

The new base, which forms a crystalline almost colorless powder, has the formula $C_7H_9N_5O_2$, and the reaction according to which it is formed is expressed in the following equation:

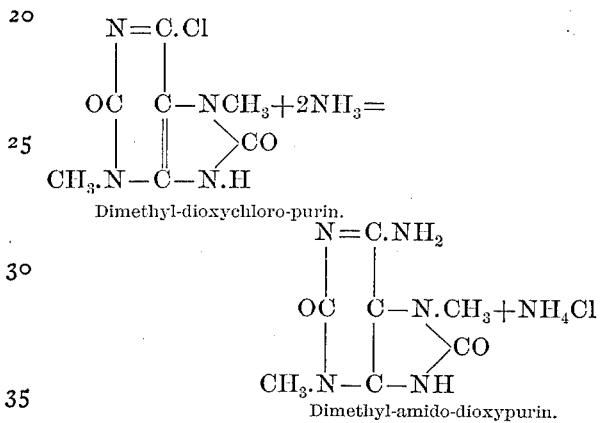

Dimethyl-dioxychloro-purin.

Dimethyl-amido-dioxypurin.

The new base is decomposed at a high temperature with a separation of free carbon. It is almost insoluble in hot water, soluble only with difficulty in boiling alcohol, and insoluble in chloroform. It forms permanent salts with mineral acids. The aurochlorate is obtained in the form of fine yellow needles from dilute hot hydrochloric acid. When the same separates out slowly, it forms in red lamina or plates. The base is readily soluble in alkalies. Strong alkalies precipitate the corresponding salts in the form of fine needles. In aqueous-ammonia solution the amido compound is readily soluble if kept warm, but is again precipitated on evaporating off the ammonia. Dilute nitric acid rapidly destroys the base in the heat, the decomposition being attended by the evolution of gases.

*Example No. 2—Preparation of 6 amido 8 oxy 2 chloro purin from 2.6 dichloro 8 oxy purin.*—The dichloro-oxypurin employed in this example may be prepared according to the process set forth in the application of Lorenz and Fritz Ach, filed June 14, 1897, Serial No. 640,762. As set forth in that application, this process consists in taking one kilogram of acid urate of potassium in a dry state and mixing the same well with one and two-tenths kilograms of phosphorus oxychlorid and heating the whole to 160° centigrade, the mixture being maintained at this temperature for four hours in a closed vessel. The excess of oxychlorid being distilled off and the residue washed with water, its impurities are removed by nitric acid or by separating the dichloro-oxypurin therefrom as an ammonium salt.

Another method of preparing this starting material, as set forth in the aforesaid application, is to heat one part, by weight, of uric acid, together with five parts, by weight, of phosphorus oxychlorid in a digester to from 170° to 175° centigrade and maintaining this temperature for from twenty-four to thirty hours, while constantly agitating the mass. The resulting brownish liquid is evaporated to dryness *in vacuo* to remove excess of phosphorus oxychlorid, and the amorphous residue is dissolved in alcohol, out of which solution the dichloro-oxypurin crystallizes as coarse yellow crystals after boiling and concentrating. A complete purification of the compound is effected by warming or heating the same for a short time in nitric acid of the specific gravity 1.41.

The dichloro-oxypurin is a dibasic acid which decomposes carbonates on boiling. It is affected with far greater difficulty than uric acid by oxidizing agents, such as strong nitric acid. It forms a permanent silver salt with an ammoniacal silver solution. It is soluble with extreme difficulty in water. From alcohol, which takes it up only with difficulty, it crystallizes in very small needles, which are decomposed at over 300° centigrade. Its structural formula is:

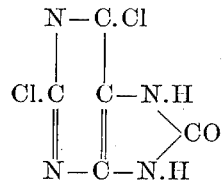

From the location of the oxygen and chlorin atoms the same is hence to be designated as "2.6 dichloro 8 oxy purin." One part of the dichloro-oxypurin is added to twenty-five parts of alcoholic ammonia, made by mixing equal volumes of an alcoholic solution of ammonia, saturated at 0° centigrade, and absolute alcohol. The mixture is then heated to 150° under pressure—*e. g.*, in a digester—and maintained at this temperature for six hours. After cooling a crystalline mass composed of globular bodies is separated out, which mass contains the largest portion of the amido compound. This is then converted into the hydrochlorate by boiling with sixty times its weight of hydrochloric acid of thirteen per cent. strength. The hydrochlorate is separated in pale yellow needles on cooling.

The free base, amido-oxychloro-purin, is obtained by suspending the latter salt in water and supersaturating the same with ammonia. For complete purification the base is best converted into the barium salt by heating one part of the base with two parts of crystalline barium hydrate and seventy parts of water to the boiling-point. On cooling the barium salt is separated in the form of colorless, long, and fine needles. The base is isolated in the form of fine felted needles by adding acetic acid to a hot aqueous solution of the barium salt. This base, amido-oxychloro-purin, has the formula $C_5H_4N_5ClO$, and the reaction taking place in preparing it from dichloro-oxypurin is expressed in the equation

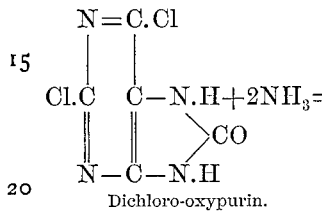
Dichloro-oxypurin.

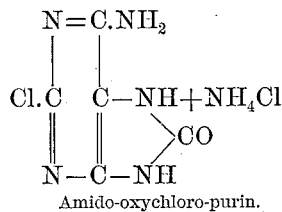
Amido-oxychloro-purin.

On heating to over 380° centigrade the base is decomposed without melting. It is only sparingly soluble in hot water and alcohol. The salts which it forms with acids are decomposed by water. The above-described difficultly-soluble hydrochlorate is characteristic of this base. This base is readily soluble in dilute alkalies and in warm dilute ammonia. The ammonium salt is decomposed in boiling, the free base being separated. It also acts as a strong reducing agent for silver solutions in the presence of heat. Upon continued heating with concentrated hydrochloric acid to 120° the base is converted into 6 amido 2.8 dioxy purin. The conversion of the latter base into adenin, as set forth in my application filed December 24, 1897, Serial No. 663,421, establishes with a certainty that the structural formula of this base, 6 amido 8 oxy 2 chloro purin, must be

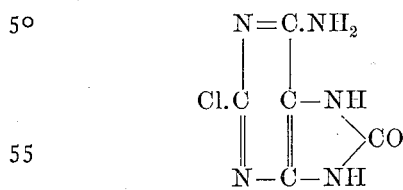

*Example No. 3—Preparation of 2.6 diamido 8 oxy purin from 2.6 dichloro 8 oxy purin.—* If the dichloro-oxypurin employed in Example No. 2 is heated to 150° centigrade, together with aqueous ammonia instead of alcoholic ammonia, it will exchange both halogen atoms for amido radicals. Nine parts of dichloro-oxypurin, which is obtained in the manner set forth under Example No. 1, are added to ninety parts of aqueous ammonia of fourteen per cent. strength and heated under pressure in a digester or the like to 150° centigrade, this temperature being maintained for the period of four hours. After cooling this new base is separated out in pale yellow foliated crystals, which are purified by converting them into the hydrochlorate. From the hydrochlorate the base is liberated by ammonia and thereby obtained in colorless long needles. Its empirical formula is $C_5H_6N_6O$ and its structural formula

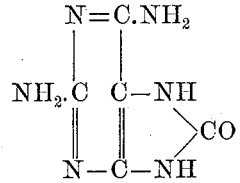

The reaction which takes place in the process of preparing it is expressed in the following equation:

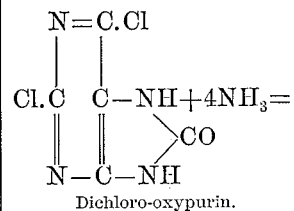
Dichloro-oxypurin.

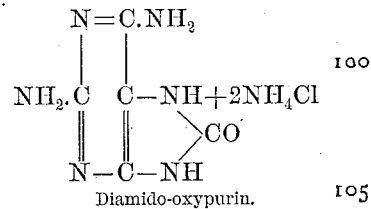
Diamido-oxypurin.

In an air-dried condition the new base, diamido-oxypurin, is combined with one molecule of water, which water is expelled on heating for nine hours to 130° centigrade. This diamido-oxypurin has no melting-point, being charred at a higher temperature. It is soluble in about three hundred and fifty parts of boiling water and yields salts with acids, which are readily crystallizable. The hydrochlorate and the sulfate of the base, the latter of which dissolves only with difficulty, crystallize in the form of fine needles. When treated with nitric acid in the cold, a salt or nitrate is obtained which is soluble only with difficulty, while the said nitric acid under the influence of heat serves to oxidize the diamido-oxypurin.

*Example No. 4—Preparation of 6 amido 2.8 dichloro purin from 2.6.8 trichloro-purin.—* In preparing this new compound I use as a starting product 2.6.8 trichloro-purin, a body which has been first prepared by me from 2.6 dichloro 8 oxy purin, which latter compound has been first discovered and produced by Lorenz and Fritz Ach. The methods of preparing the dichloro-oxypurin and the trichloro-purin are set forth, respectively, in the application for Letters Patent of the United States filed by the said Lorenz and Fritz Ach on June 14, 1897, and having the Serial No. 640,762, and in my Letters Patent No. 598,502, dated February 8, 1898. The preparation and properties of the 2.6 dichloro 8 oxy purin have been described under Example No. 2. As set forth in my patent above referred to, the trichloro-purin may be obtained from this dichloro-oxypurin in the following manner: One part of the finely-powdered dichloro-oxypurin is heated in a closed vessel with seventy parts of phosphorus oxychlorid to from 150° to 155° centigrade and maintained at this temperature for four hours, the mixture being agitated as frequently as possible. At the close of the reaction a clear solution having a pale yellow color is formed. This solution is evaporated *in vacuo* to completely remove all traces of the phosphorus oxychlorid. The amorphous residue is then made crystalline by shaking the same with cold water. The colorless crystalline product so obtained is then filtered and washed with cold water. The crude product so obtained is then purified by adding five times its quantity of ether, in which the largest portion of the impurities are insoluble. After removing the ether the residue is boiled with sixty times its weight of water. The trichloro-purin is thus brought into solution, a foreign substance mixed with the same in the crude product remaining as a solid residue when the solution or liquid has been filtered off or otherwise separated. On cooling the trichloro-purin is obtained from this solution in the form of fine colorless scales.

The trichloro-purin has the structural formula

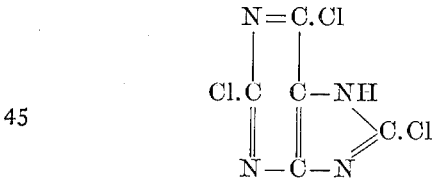

and combines with five molecules of water of crystallization, which latter is completely driven off at a temperature of about 110° centigrade. The substance thus dried on further heating begins to soften, melting at 184° to 188° centigrade, attended by frothing.

The dehydrated compound dissolves in about seventy parts of boiling water, is readily soluble in warm alcohol, ether, acetone, and chloroform, and in dilute alkalies. Mineral acids precipitate it from its solutions.

In order to prepare the amidodichloro-purin, I add one part of the dried 2.6.8 trichloro-purin to ten parts of an aqueous solution of ammonia which has been saturated at ordinary room temperature and heat the same under pressure in a digester or the like to 100° centigrade and maintain this temperature for six hours. A substitution of an amido radical for a chlorin atom thus takes place according to the following equation:

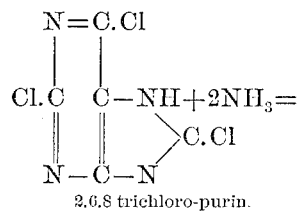
2.6.8 trichloro-purin.

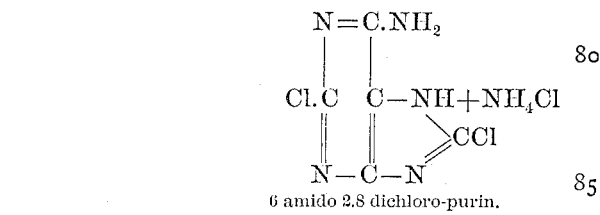
6 amido 2.8 dichloro-purin.

The ammoniacal solution is evaporated to dryness, the dry residue being then lixiviated or washed out with water and the liquor filtered off from the amido compound which does not dissolve. The yield is over ninety-five per cent. of the theoretical amount.

For complete purification this new body, which is a base, is dissolved in about two hundred parts of boiling alcohol. The liquid is then concentrated by evaporation or the like, and from the so-concentrated liquor the new body separates out on cooling in the form of microscopic needles united in the form of stars. The analysis of this body gives the numbers corresponding to the formula $C_5H_3N_5Cl_2$.

This new compound has no melting-point, being gradually decomposed at a temperature beyond 300° centigrade. More than two thousand parts of hot water are required to dissolve the same, and on cooling it crystallizes from the solution in microscopic needles. About two hundred parts of hot alcohol are required to dissolve the same.

The alkaline properties of the new compound are not great, and hence it is taken up only with difficulty by dilute mineral acids. It dissolves in considerable quantities in fifteen per cent. hot hydrochloric or in twenty-five per cent. nitric or sulfuric acid. After cooling the corresponding salts are thrown out in crystalline form.

If the new compound is boiled for some time in dilute acids, it is decomposed. In dilute alkalies it is readily dissolved, while concentrated lyes serve to throw down the corresponding salts in the form of fine needles. The ammonia-salt is decomposed on boiling, and with nitrate of silver the same gives rise to a colorless amorphous precipitate, which is unaffected by heat and is soluble with difficulty in an excess of ammonia. The fact that this base may be converted into adenin, as shown in my application filed December 24, 1897, Serial No. 663,421, demonstrates the correctness of the structural formula which I have given it:

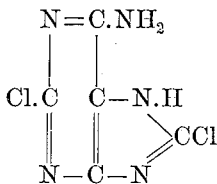

*Example No. 5—Preparation of 7 methyl 2 amido 6 chloro purin from 7 methyl 2.6 dichloro purin.*—The starting material in this example, the 7 methyl 2.6 dichloro purin, is a new compound first prepared by me, and it, as well as the method of preparing the same, constitutes the subject-matter of my application filed September 7, 1897, Serial No. 650,826. I will, however, set forth its preparation in this description in order to make the same a full disclosure of my present invention. In order to prepare this 7 methyl 2.6 dichloro purin, I take ten parts of theobromin and add it to one hundred parts of phosphorus oxychlorid and heat the mixture under pressure to 140° centigrade, maintaining the same at this temperature and under pressure for four hours, the mass being constantly agitated. The unchanged phosphorus oxychlorid is completely removed from the resulting clear light-brown liquid by distilling *in vacuo*. Then one hundred and fifty parts of cold water are poured over the amorphous residue. As a result of the last treatment the mass is gradually changed to almost colorless crystals. This crystallization is hastened by shaking, while the spontaneous heating of the same is counteracted by cooling with ice. After undergoing a final thorough cooling the mass is filtered and the crystals are then washed with ice-water. The crude product thus formed contains an impurity which is soluble in alkali. I therefore lixiviate the same with cold greatly-diluted soda-lye, then filter, and after thoroughly washing the residue left on the filter dissolve the same in hot water. The methyl-dichloro-purin crystallizes out of this solution in a pure state and in the form of fine colorless needles, which melt at 196° to 197° centigrade and have the composition indicated by the formula

or

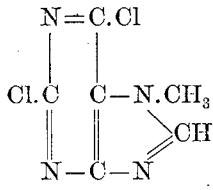

that is to say, it is 7 methyl 2.6 dichloro purin. Methyl-dichloro-purin is soluble only with difficulty in cold water and in hot water in the proportion of one part to about seventy parts of water. It is soluble in about thirty parts of boiling alcohol.

To prepare 7 methyl 2 amido 6 chloro purin, I take five parts of the methyl-dichloro-purin and mix the same with two hundred parts of alcoholic solution of ammonia which has been half saturated at ordinary temperature, (about 20° centigrade.) This mixture is then heated in a closed vessel to from 85° to 90° centigrade and maintained at this temperature for three hours. It is advantageous to shake the mass in the beginning of the operation. When this operation has been completed, the mass is evaporated to dryness without previous filtration. The residue is then dissolved in boiling water. On cooling the new compound, which is a base, separates from the mother liquor in the form of fine white needles, which are suspended in the liquor, so as to permeate or fill the same in the form of a pulp. This base has the formula:

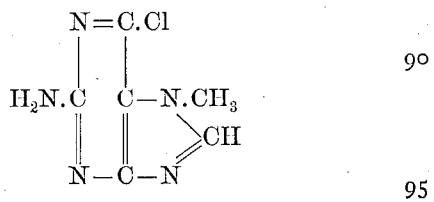

It is formed in accordance with the equation:

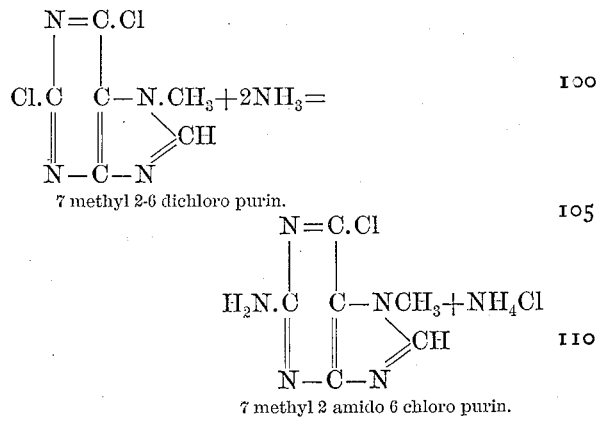

That the new base is a 7 methyl 2 amido 6 chloro purin follows from the fact that guanidin is formed on splitting up 7 methyl 2 amido 6 oxypurin, which is derived from this base. The position of the amido group in the molecule is thus fixed. The new base melts at about 276° centigrade, the melting being attended by the evolution of gas. It is soluble in about seventy parts boiling water, but dissolves only with difficulty in cold water and hot alcohol. It is readily soluble in mineral acids, with which it forms well-crystallized salts.

*Example No. 6—Preparation of 7 methyl 2.6 diamido purin from 7 methyl 2.6 dichloro purin.*—Two parts of methyl-dichloro-purin whose preparation and properties have been set forth above are mixed with forty parts of aqueous solution of ammonia of fourteen-per-cent. strength. These are then heated to 160° centigrade in a closed tube and maintained at this temperature for four hours. On cooling the diamido compound separates out of the liquor in the form of fine needles. After standing for several hours the whole is filtered and the crude product remaining on the filter is then dissolved in ninety times its weight of hot water. The solution is cooled or allowed to cool slowly when the new diamido base is obtained in the form of small compact crystals whose analysis gives the figures which correspond to the formula $C_6H_8N_6$. The structural formula is:

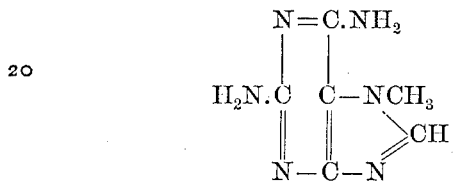

The reaction which takes place in the preparation of this new compound is expressed in the equation:

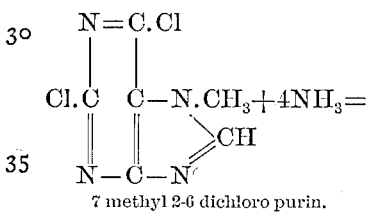

7 methyl 2-6 dichloro purin.

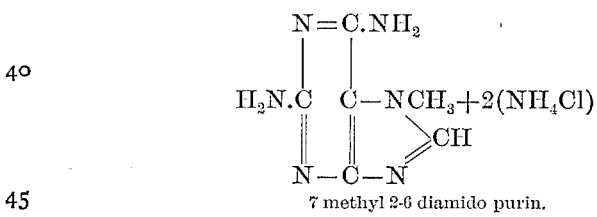

7 methyl 2-6 diamido purin.

The methyl-diamido-purin melts at about 385° centigrade, the melting being attended by strong decomposition. It is soluble in about ninety parts boiling water and is soluble only with difficulty in alcohol. It forms salts which crystallize well and from whose solutions the base—i. e., the methyl-diamido-purin—is precipitated by alkalies, including ammonia. Nitrate of silver added to a solution of the base in nitric acid produces an immediate colorless precipitate which crystallizes in the form of coarse needles from warm nitric acid.

*Example No. 7—Preparation of 7 methyl 2 amido 6 oxy purin from 7 methyl 6 oxy 2 chloro purin.*—The starting material in this example, the 7 methyl 2 chloro 6 oxy purin, is a new body which has first been prepared and discovered by me. Its preparation and properties are described in my application filed September 7, 1897, Serial No. 650,826.

In order to make a full disclosure of my invention, I will now first set forth the preparation and properties of this starting material. Ten parts of finely-pulverized 7 methyl 2 6 dichloro purin, whose preparation and properties have been described hereinabove, are suspended in one hundred parts of boiling water and then an amount of soda-lye, estimated for two molecules of the methyl-dichloro-purin, is added. The entire mass is then stirred until a clear solution is formed, which takes place in a short time. The formation of the clear solution indicates the end of the reaction. The liquid having been allowed to cool, acetic acid is added until the liquid is supersaturated, when the methyl-chloro-oxy-purin is precipitated in the form of crystals. The product is boiled or extracted with one hundred and fifty parts of water and then filtered. On cooling the filtrate yields short yellow column-shaped crystals.

To completely purify the new product, it is converted into the barium salt, which crystallizes in fine prisms. The barium salt is then converted into the free methyl-chloro-oxy-purin by dissolving in fifty to sixty parts hot water and supersaturating with acetic acid. After cooling the new compound crystallizes in long white needles. The analysis of this body shows that its formula is $$C_6H_5N_4OCl,$$

or

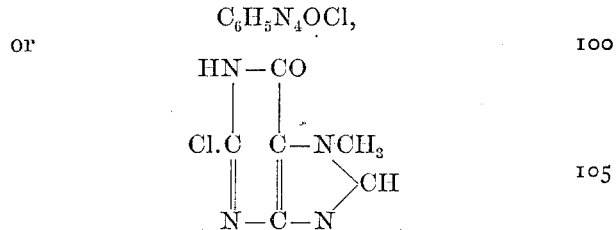

which shows that it is 7 methyl 2 chloro 6 oxy purin.

The pure methyl-chloro-oxy-purin becomes yellow at about 310° centigrade, and at a higher temperature its color becomes darker and decomposition takes place progressively with the rising temperature. It dissolves in about one hundred and fifty parts of boiling water and about two hundred and fifty parts boiling alcohol.

To prepare the 7 methyl 2 amido 6 oxy purin, the 7 methyl 6 oxy 2 chloro purin is mixed with twelve times its weight of ammonia solution saturated at 5° centigrade and heated to 150° centigrade, this temperature being maintained for six hours. After cooling and without filtering the mass is evaporated to dryness. The residue is lixiviated or washed with cold water, then dissolved in dilute soda-lye, and then precipitated by acetic acid. The resulting amorphous precipitate may then be converted into a voluminous crystalline mass upon heating the same upon the water-bath. This crystalline mass is then dissolved in hot water and recrystallized from the same. The fine needles so obtained on analysis give the proportions corresponding to the formula $C_6H_7N_5O$. The structural formula of this base is

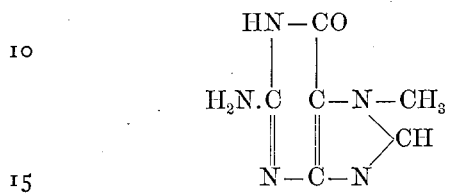

and the principal reaction taking place in its formation is expressed in the equation:

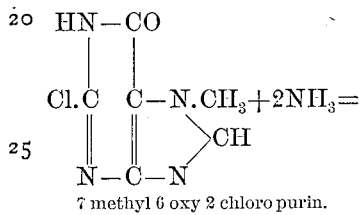

7 methyl 6 oxy 2 chloro purin.

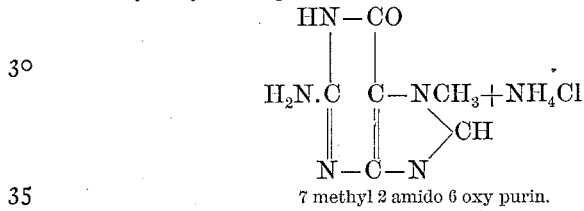

7 methyl 2 amido 6 oxy purin.

This new base is decomposed on heating beyond about 400° centigrade. It is dissolved with great difficulty in alcohol and in water, nine hundred parts of the latter being required in connection with boiling for some time. It is readily soluble in dilute cold alkalies, but only with difficulty in warm dilute ammonia. It forms salts with mineral acids, which salts form fine crystals. Nitrate of silver when added to an ammoniacal solution throws out a colorless gelatinous precipitate. If the nitrate of silver be added to a solution of the base in nitric acid, an amorphous precipitate is first produced. This precipitate may be changed to form colorless fine needles by redissolving in dilute hot nitric acid and crystallizing from such solution. On oxidizing with chlorate of potassium and hydrochloric acid guanidin is obtained from this new base.

*Example No. 8—Preparation of 9 methyl 6 amido 8 oxy 2 chloro purin from 9 methyl 8 oxy 2.6 dichloro purin.*—In order to prepare this base, one part of 9 methyl 8 oxy 2.6 dichloro purin (*Berichte der Deutschen Chemischen Gesellschaft* 17, 330) is heated in a digester to from 140° to 150° centigrade, together with ten parts of an alcoholic solution of ammonia saturated at ordinary temperature and maintained at this temperature (140° to 150°) for five hours. After cooling large brilliant crystals are separated out, which are filtered and washed with cold water. For complete purification the base is dissolved in dilute soda-lye and precipitated on heating by acetic acid. The short brilliant needles so obtained have the composition indicated by the formula $C_6H_6N_5OCl$. The body is formed in accordance with the equation:

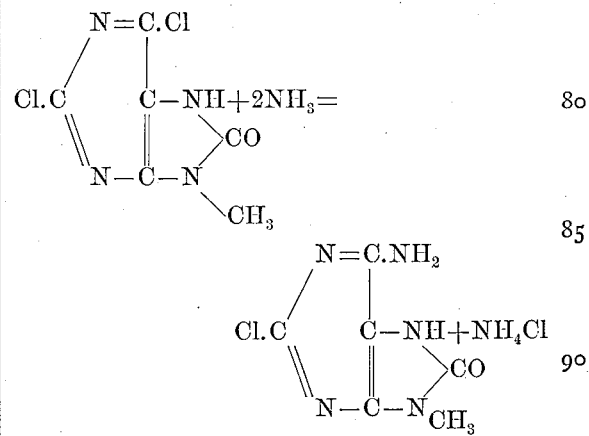

The new base has no melting-point. It becomes brown at about 360° centigrade, and on heating the substance rapidly it sublimes partially. It is dissolved with great difficulty in boiling water and alchohol, pretty soluble in a warm strong aqueous solution of ammonia, and very readily soluble in dilute alkalies. It dissolves in hot dilute hydrochloric or sulfuric or nitric acid. After cooling the corresponding salts are thrown out in form of fine needles or prisms. With nitrate of silver the ammoniacal solution gives rise to an amorphous precipitate, which becomes dark on boiling.

*Example No. 9—Preparation of 7 methyl 6 amido 8 oxy 2 chloro purin from 7 methyl 8 oxy 2.6 dichloro purin.*—To prepare this new compound, the 7 methyl 8 oxy 2.6 dichloro purin beta dichloro-oxy-methyl-purin (*Berichte der Deutschen Chemischen Gesellschaft*, 28, 2490) is heated in a digester to 145° to 150° centigrade for five hours, together with fifteen times its weight of an alcoholic ammonia solution saturated at ordinary room temperature. The crystals separated out after cooling are filtered and washed with alcohol and water. To purify the new product, it is finely pulverized and boiled with fifty parts of two-per-cent. hydrochloric acid for fifteen minutes. Then the hot liquid is filtered and the residue is dissolved in hot dilute ammonia. When the ammonia is removed by boiling, the free base separates in the form of long brilliant scales, generally obliquely truncated, which when air-dried have the composition corresponding to $C_6H_6$ $N_5OCl + H_2O$. The water of crystallization completely escapes at 125° centigrade.

The new compound is formed in accordance with the equation:

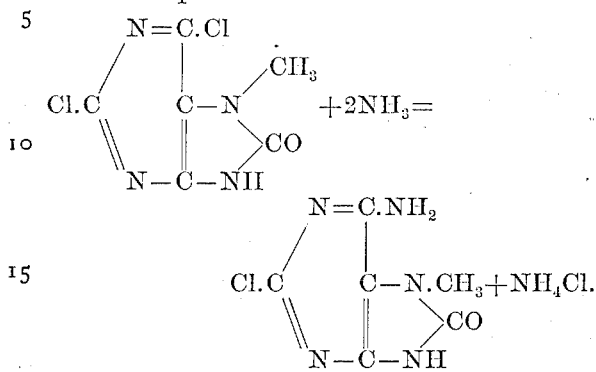

The base has no melting-point. When rapidly heated, it sublimes partially and carbonizes at a higher temperature. It dissolves in about fourteen hundred parts of boiling water and one thousand parts of boiling alchohol. After cooling it crystallizes in the form of small long scales. From the solution in hot dilute hydrochloric or nitric acid the corresponding salts are obtained in a well-crystallized condition. The base is readily soluble in dilute soda-lye. From this solution a concentrated soda-lye precipitates the sodium salt in the form of fine small needles. With nitrate of silver the ammoniacal solution of the base gives rise to a colorless amorphous precipitate.

These new compounds, the amido-purins which have the amido groups or radicals in the alloxan nucleus, all form crystalline products. They are bases and form well-crystallized salts with acids.

As seen from the above description, they are all decomposed at high temperatures and none of them has a melting-point, as they decompose before reaching the same or in melting. They are all dissolved with difficulty in alcohol and insoluble or soluble with difficulty in water.

What I claim, and desire to secure by Letters Patent of the United States, is—

1. The process which consists in causing ammonia to act upon a chlorin derivative of purin having chlorin bound to the alloxan nucleus.

2. The process which consists in adding a chlorin derivative of purin to a solution of ammonia and heating the mixture under pressure, substantially as set forth.

3. The process which consists in adding a chlorin derivative of purin having the chlorin bound to the alloxan nucleus to a solution of ammonia, and heating the mixture under pressure.

4. The process which consists in adding a chlorin derivative of purin, having a chlorin atom bound to the carbon atom (2) or (6), to a solution of ammonia and heating the mixture under pressure.

5. As new chemical compounds amido-purin derivatives which are distinguished by having the amido radical bound to the alloxan nucleus of the purin residue.

6. As new chemical compounds amido-purin derivatives which have the amido radical bound to the alloxan nucleus of the purin residue and which are distinguished by the following properties: they are bases; they form crystalline products; they have no melting-point since they decompose at high temperatures before reaching the melting-point or while melting; they are all dissolved with difficulty in alcohol and water.

In testimony whereof I affix my signature in presence of two witnesses.

EMIL FISCHER.

Witnesses:
HENRY HASPER,
W. HAUPT.